United States Patent [19]
Llewellyn et al.

(10) Patent No.: US 7,515,310 B2
(45) Date of Patent: Apr. 7, 2009

(54) PROGRAMMABLE GAIN AMPLIFIER WITH HYBRID DIGITAL/ANALOG ARCHITECTURE

(75) Inventors: William Llewellyn, San Jose, CA (US); Seema Varma, Sunnyvale, CA (US); Ha Chu Vu, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1103 days.

(21) Appl. No.: 10/791,909

(22) Filed: Mar. 3, 2004

(65) Prior Publication Data

US 2005/0195448 A1    Sep. 8, 2005

(51) Int. Cl.
  *H04N 1/40* (2006.01)
  *H04N 1/46* (2006.01)
  *H04N 1/04* (2006.01)

(52) U.S. Cl. .................. 358/446; 358/3.21; 358/514; 358/483

(58) Field of Classification Search .................. 358/446, 358/3.21, 514, 483, 486, 530, 505, 463, 406, 358/474; 348/678; 327/307; 250/214 AG; 330/9, 98, 258, 278, 310, 254
  See application file for complete search history.

(56) References Cited

U.S. PATENT DOCUMENTS

| | | | | |
|---|---|---|---|---|
| 5,563,723 A * | 10/1996 | Beaulieu et al. | ............. | 358/446 |
| 6,441,684 B1 * | 8/2002 | Nakamura | ...................... | 330/9 |
| 6,839,153 B1 * | 1/2005 | Shimizu | .................... | 358/3.21 |
| 6,937,361 B1 * | 8/2005 | Kondo et al. | ................. | 358/486 |
| 7,072,075 B2 * | 7/2006 | Kondo et al. | ................. | 358/530 |
| 7,382,296 B2 * | 6/2008 | Delanghe et al. | ............ | 341/118 |
| 2004/0057616 A1 * | 3/2004 | Kondo et al. | ................. | 358/505 |
| 2005/0083543 A1 * | 4/2005 | Suzuki et al. | ................ | 358/514 |
| 2006/0061836 A1 * | 3/2006 | Maruchi et al. | ............. | 358/483 |
| 2007/0109605 A1 * | 5/2007 | Shimizu | ..................... | 358/463 |

FOREIGN PATENT DOCUMENTS

JP    2002-271631    *  9/2002

OTHER PUBLICATIONS

International Search Report and Written Opinion mailed Jun. 27, 2008 for International Patent Application No. PCT/US05/07026.

\* cited by examiner

*Primary Examiner*—Houshang Safaipour
(74) *Attorney, Agent, or Firm*—Darby & Darby P.C.; John Tolomei (57) ABSTRACT

Circuits, devices, and methods for enabling the digitization of scanned images with an Analog Front End (AFE) circuit. The AFE circuit includes a sampler for sampling a signal produced by an image sensor and in response generating analog image samples. The AFE circuit also includes a Programmable Gain Amplifier for generating amplified samples by amplifying the analog image samples. The AFE circuit further includes an Analog to Digital Converter for generating digitized samples from the amplified samples; and a Digital Programmable Gain Amplifier for amplifying the digitized samples which are subsequently presented to a processor for further processing of the scanned image. Accordingly, the scanned image is digitized with amplification taking place both in the analog and in the digital domain, deriving benefits from each. The AFE circuit may be calibrated in two steps, once for each of the domains.

20 Claims, 9 Drawing Sheets

CALIBRATE

| s | Gain | Vin(min) | Vin(max) | Gain ratio prev. step |
|---|---|---|---|---|
| | $G(s) = 1+s*N$ $N = 7/31$ | $Vn = 0.8/G$ | $Vm = 1/G$ | $R = G(s)/G(s-1)$ |
| 0 | 1 | 0.8 | 1 | n/a |
| 1 | 1.225806452 | 0.652631579 | 0.815789474 | 1.225806452 |
| 2 | 1.451612903 | 0.551111111 | 0.688888889 | 1.184210526 |
| 3 | 1.677419355 | 0.476923077 | 0.596153846 | 1.155555556 |
| 4 | 1.903225806 | 0.420338983 | 0.525423729 | 1.134615385 |
| 5 | 2.129032258 | 0.375757576 | 0.46969697 | 1.118644068 |
| 6 | 2.35483871 | 0.339726027 | 0.424657534 | 1.106060606 |
| 7 | 2.580645161 | 0.31 | 0.3875 | 1.095890411 |
| 8 | 2.806451613 | 0.285057471 | 0.356321839 | 1.0875 |
| 9 | 3.032258065 | 0.263829787 | 0.329787234 | 1.08045977 |
| 10 | 3.258064516 | 0.245544554 | 0.306930693 | 1.074468085 |
| 11 | 3.483870968 | 0.22962963 | 0.287037037 | 1.069306931 |
| 12 | 3.709677419 | 0.215652174 | 0.269565217 | 1.064814815 |
| 13 | 3.935483871 | 0.203278689 | 0.254098361 | 1.060869565 |
| 14 | 4.161290323 | 0.192248062 | 0.240310078 | 1.057377049 |
| 15 | 4.387096774 | 0.182352941 | 0.227941176 | 1.054263566 |
| 16 | 4.612903226 | 0.173426573 | 0.216783217 | 1.051470588 |
| 17 | 4.838709677 | 0.165333333 | 0.206666667 | 1.048951049 |
| 18 | 5.064516129 | 0.157961783 | 0.197452229 | 1.046666667 |
| 19 | 5.290322581 | 0.151219512 | 0.18902439 | 1.044585987 |
| 20 | 5.516129032 | 0.14502924 | 0.18128655 | 1.042682927 |
| 21 | 5.741935484 | 0.139325843 | 0.174157303 | 1.040935673 |
| 22 | 5.967741935 | 0.134054054 | 0.167567568 | 1.039325843 |
| 23 | 6.193548387 | 0.129166667 | 0.161458333 | 1.037837838 |
| 24 | 6.419354839 | 0.124623116 | 0.155778894 | 1.036458333 |
| 25 | 6.64516129 | 0.12038835 | 0.150485437 | 1.035175879 |
| 26 | 6.870967742 | 0.116431925 | 0.145539906 | 1.033980583 |
| 27 | 7.096774194 | 0.112727273 | 0.140909091 | 1.03286385 |
| 28 | 7.322580645 | 0.109251101 | 0.136563877 | 1.031818182 |
| 29 | 7.548387097 | 0.105982906 | 0.132478632 | 1.030837004 |
| 30 | 7.774193548 | 0.102904564 | 0.128630705 | 1.02991453 |
| 31 | 8 | 0.1 | 0.125 | 1.029045643 |

PROGRAMMABLE GAIN AMPLIFIER WITH HYBRID DIGITAL/ANALOG ARCHITECTURE

FIELD OF THE INVENTION

The present invention is related to the field of electronic circuits for programmable gain amplifiers, and more specifically to calibrating and employing these amplifiers in the digitizing of a scanned image.

BACKGROUND

Digital imaging systems, such as copiers, facsimile machines, and scanners have become commonplace. Such systems scan an image into an analog signal, and convert the analog signal into a digital signal for processing or storage. This analog to digital conversion takes place in a digitizing channel of the system. Typically, an Analog Front End (AFE) circuit is employed in the digitizing channel, for amplifying and digitizing the analog signal. AFEs often include circuitry for gain calibration and offset cancellation, in addition to converting the analog signal into a digital signal. Gain calibration is employed to (a) match the level of the incoming analog signal to the available dynamic range of the digitizing channel to achieve improved signal-to-noise ratio (SNR), and (b) in color systems, to balance the relative levels of the red, green, and blue (RGB) digitizing channels for proper color interpretation. Offset cancellation is used for the conventional reasons of minimizing signal errors throughout the digitizing channel.

BRIEF DESCRIPTION OF THE DRAWINGS

The invention will become more readily apparent from the following Detailed Description, which proceeds with reference to the accompanying drawings, in which:

FIG. 6 represents a table of values for gain windows that exhibit overlap so as to cover an entire range;

DETAILED DESCRIPTION

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as circuits, devices, methods, and so on. The following detailed description is, therefore, not to be taken in a limiting sense.

Throughout the specification, the meaning of "a," "an," and "the" may also include plural references. The meaning of "in" includes "in" and "on." The term "coupled" means a direct connection between the items that are connected, or an indirect connection through one or more intermediary devices or components.

Briefly, the present invention is directed to an Analog Front End (AFE) circuit with a hybrid digital/analog architecture suitable for calibrating and digitizing scanned images. In one embodiment, the Analog Front End (AFE) circuit includes a sampling block for sampling a voltage produced by a CCD array during the scanning of an image, and a Programmable Gain Amplifier (PGA) for generating amplified analog samples of the scanned image. The AFE circuit also includes an Analog to Digital Converter (ADC) for generating digitized samples from the amplified analog samples, and a Digital Programmable Gain Amplifier (DPGA) for post amplifying the digitized samples. Accordingly, the scanned image is both digitized and amplified where the amplification occurs in both the analog and digital domains. Additionally, the AFE circuit may be calibrated for the analog and digital domains and between the scanning of each image.

By amplifying concurrently in both the analog and the digital domains, the benefits of both technologies can be included in the same AFE circuit. For example, amplification in the analog domain can provide a relatively large dynamic range with low noise. Also, programmable analog gain may further be varied in relatively coarse steps, without a relatively large number of bits, or substantial trimming, or relatively fine tuning. As such, amplification in the analog domain enables a relatively compact size, and can be performed at relatively low power. Concurrently, amplification in the digital domain can be performed with relatively fine bit resolution, and with substantially ideal linearity and monotonicity in the gain control function.

The inventive hybrid analog/digital architecture can provide a substantial majority of the variable gain in the analog domain with relatively coarse gain step resolution while achieving a relatively high gain control resolution at the system level by incorporating an additional but relatively smaller span of programmable gain into the digital domain with relatively fine step resolution. The span of gain control provided in the digital domain is selected to be large enough to exceed the individual step size of the analog gain control. In this way, the programmable digital gain can fill gaps between relatively coarse programmable analog gain steps with a string of much smaller digital gain steps, and together the two programmable gains (analog and digital) provide a relatively unbroken range of relatively finely spaced gain settings over a relatively wide range.

The inventive hybrid analog/digital PGA architecture described herein thus applies analog topology where its strengths are greatest, e.g., relatively compact size, low power, and low noise, and applies digital topology where its strengths are greatest, e.g., relatively fine bit resolution with a relatively ideal step size linearity and monotonicity in the gain control function. The resulting advantages of the invention include, but are not limited to, the following:

Overall system dynamic range is not inversely related to PGA gain setting, as can be the case with an all digital PGA;

Resolution requirements of the downstream ADC are relaxed (with respect to systems using an all digital PGA), thereby reducing overall die size and power consumption;

Analog gain control is relatively coarse (perhaps 5 bits), eliminating the need for precision elements and/or trimming;

A limited amount of digital gain is used to its fullest advantage, i.e., for relatively fine gain control between analog gain setting levels while exhibiting ideal linearity and monotonicity in the gain control function.

The invention is now described in more detail.

Figure 1:
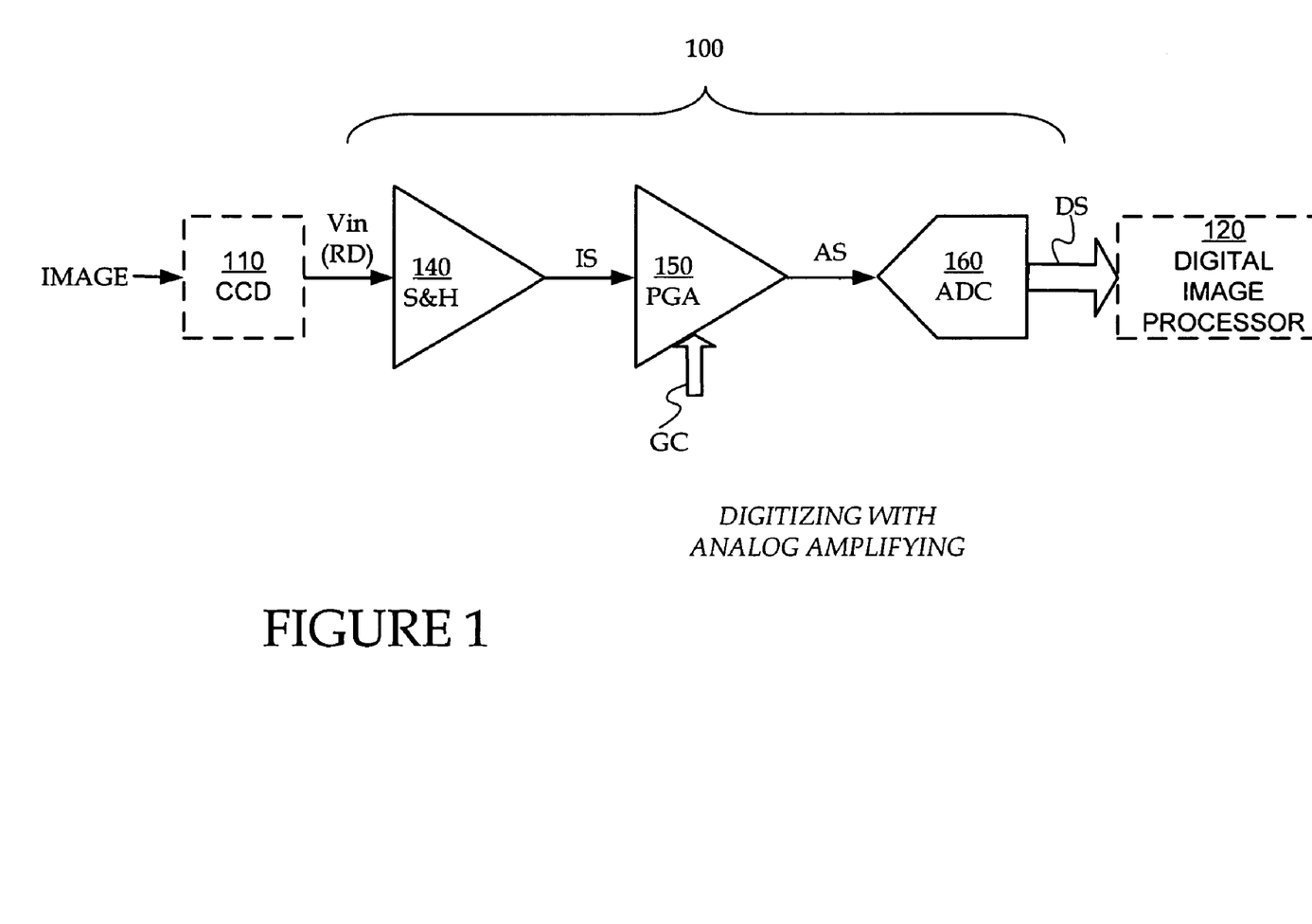
FIG. 1 illustrates a block diagram of an Analog Front End (AFE) circuit for a digital imaging system.

FIG. 1 illustrates a block diagram of Analog Front End (AFE) circuit 100 in a digitizing channel of a digital imaging system. The digitizing channel includes a charge coupled device (CCD) array 110 for sensing the image. CCD array 110 produces a voltage Vin in response to scanning the image. Voltage Vin encodes raw data RD produced from scanning the image, in a manner that is described elsewhere in this document. The digitizing channel also includes a digital image processor 120, which receives an output of AFE circuit 100.

Circuit 100 may be provided as an integrated circuit on an individual chip. It includes Sample and Hold 140, Programmable Gain Amplifier (PGA) 150, and Analog to Digital Converter (ADC) 160. Sample and Hold 140 generates analog image samples IS by sampling voltage Vin. PGA 150 generates amplified samples AS by amplifying analog image samples IS. ADC 160 generates digitized samples DS by digitizing amplified samples AS. As is described in more detail below, a gain control signal GC is set during a calibration process to control the amount of amplification performed by PGA 150.

Figure 2A:
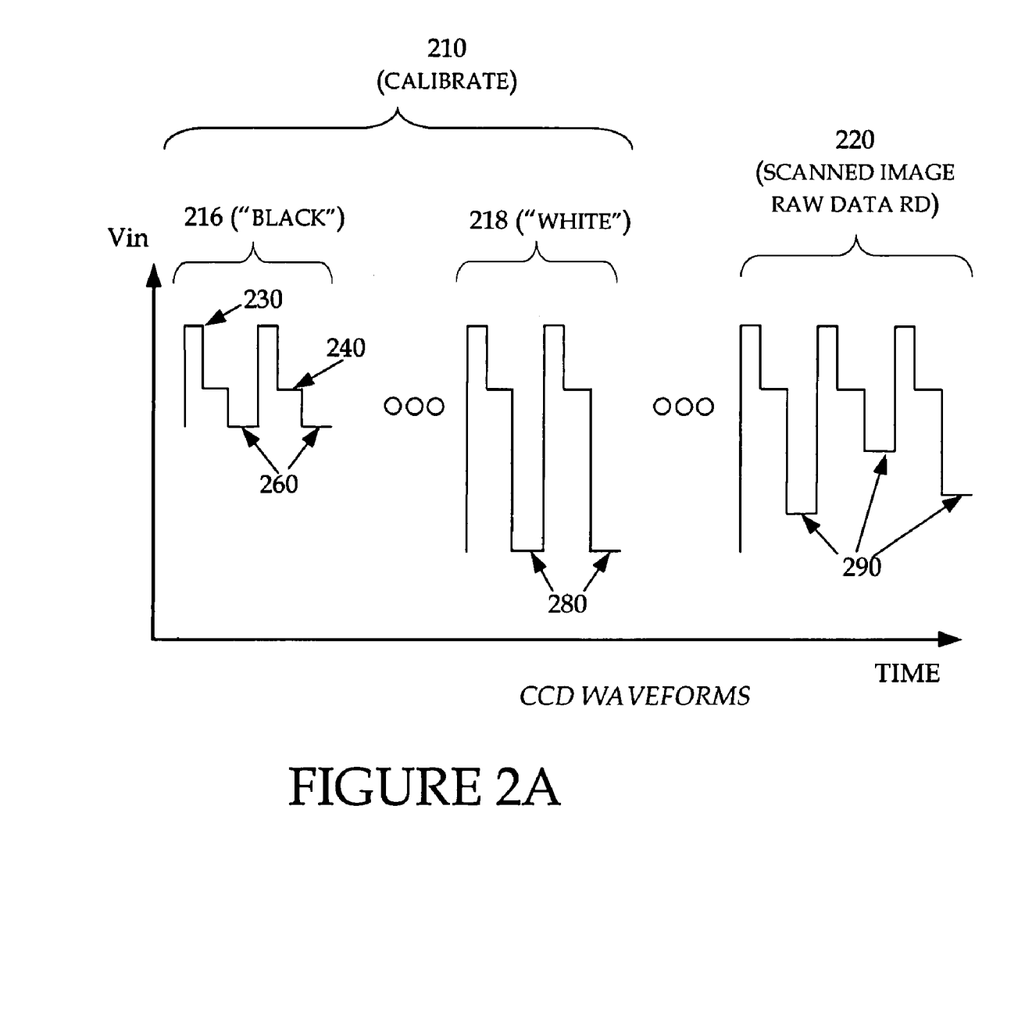
FIG. 2A illustrates sample waveforms generated by a CCD block of FIG. 1 when it performs calibration and when it scans an image.

FIG. 2A illustrates sample waveforms generated by CCD array 110. During calibration session 210, known reference images are input. During a scanning session 220, the image is scanned. The calibration session typically includes a first session 216 when a black reference image is scanned, and a second session 218 when a white reference image is scanned.

Waveform Vin includes individual pulses for the pixels of CCD array 110. Each pulse includes a reset feedthrough section 230, a reset level section 240, and then a level that encodes the viewed image intensity. During session 216, the viewed intensity is given by a level 260 that corresponds to reference black. During session 218, the viewed intensity is given by a level 280 that corresponds to reference white. During session 220, the viewed intensities are given by respective levels 290. Levels 290 generally correspond to gray levels, and are expected to have values mostly between levels 260 and 280. It is worth noting that white pixel voltage levels are more negative than black, which is typical of modern imaging systems that employ charge coupled devices as image sensors. In the process of digitization, this polarity sense is "inverted", such that black pixels produce a digitized value that is near the minimum value of the range of the ADC digital output, while white pixels produce a digitized value that is near the maximum value of the range of the ADC digital output.

Figure 2B:
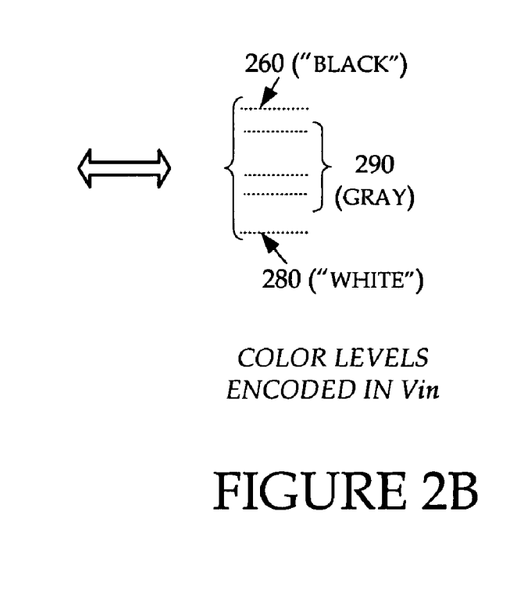
FIG. 2B illustrates how intensity levels are interpreted from the waveforms of FIG. 2A.

FIG. 2B illustrates how the intensity levels are interpreted from the waveforms of FIG. 2A. Waveform Vin is received by Sample and Hold 140, which in turn samples and isolates the intensity levels from the remainder of the waveform. During calibration, sampled intensity levels 260 and 280 are used as reference black and white respectively.

Calibration first sets the reference black at some output value, and then maps the reference white near the high end of the dynamic range. PGA 150 thus allows the relative voltage levels of FIG. 2B to be adjusted for matching the dynamic range of ADC 160. Adjustment is accomplished by varying gain control signal GC, which in turn controls the amount of amplification. Varying may include a successive approximation routine (SAR), until the reference white is mapped near the high end of the dynamic range.

In existing AFE circuits, gain control signal GC is digital, and can have as few as 5 or as many as 10 or more bits. Thus the gain control range can be subdivided into $2^N$ gain settings, where N is the number of control bits (N=5, N=10, etc.). Accordingly gain control ranges vary from 14 dB to 26 dB or higher, or in other words from [1×, 5×], to [1×, 20×].

The gain characteristic of PGA 150 needs to be substantially monotonic, in other words either increasing with increasing value of gain control signal GC, or remaining the same, but not decreasing.

Figure 3:
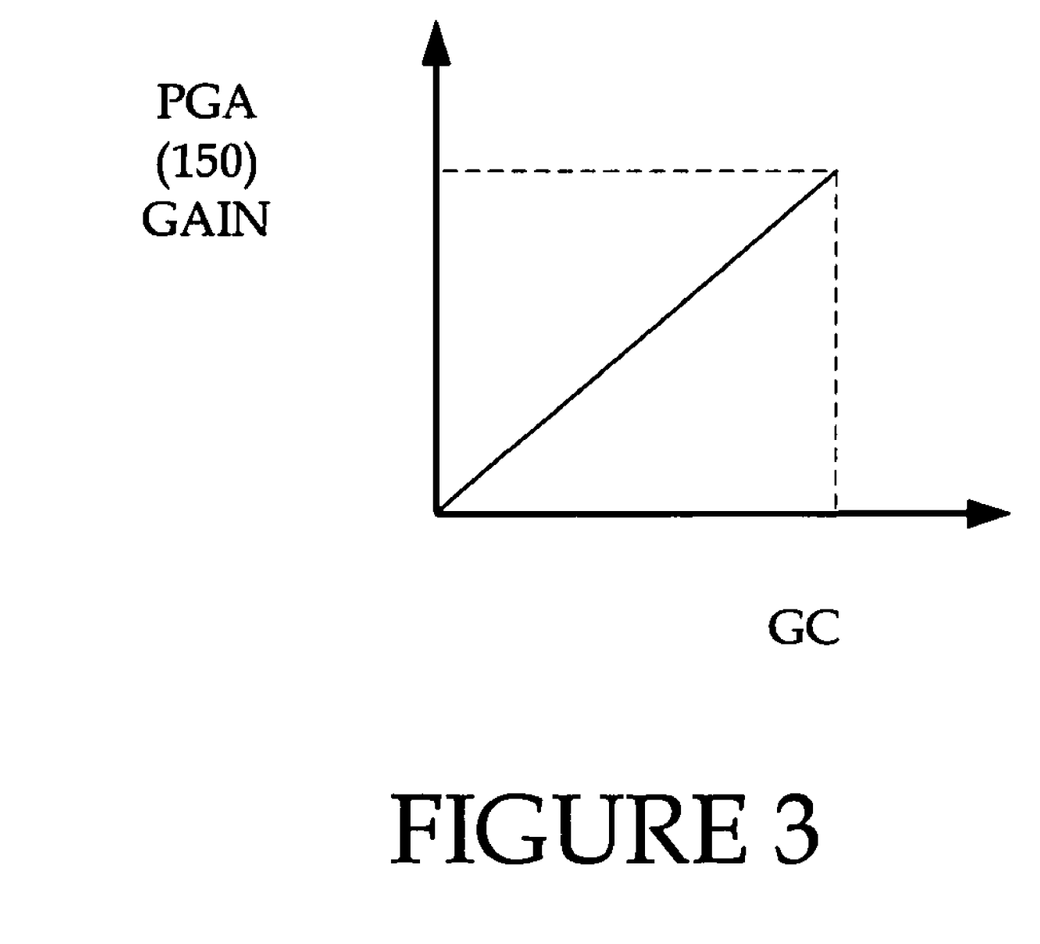
FIG. 3 illustrates a diagram of a possible programmable gain amplifier (PGA) characteristic of the gain that is applied to the levels of FIG. 2B.

FIG. 3A illustrates a diagram of a linear gain characteristic of PGA 150, which may be accomplished with proper design. The gain resolution will depend on the number of bits available for gain control signal GC. There is a problem, however, with maintaining linearity in the gain characteristic. For example, if an integrated analog PGA were required to have a 10-bit control word within a 12 bit AFE, the task of achieving 10-bit linearity in the gain response would be both difficult and costly, consuming significant die area and power, and possibly requiring trimming.

Figure 4:
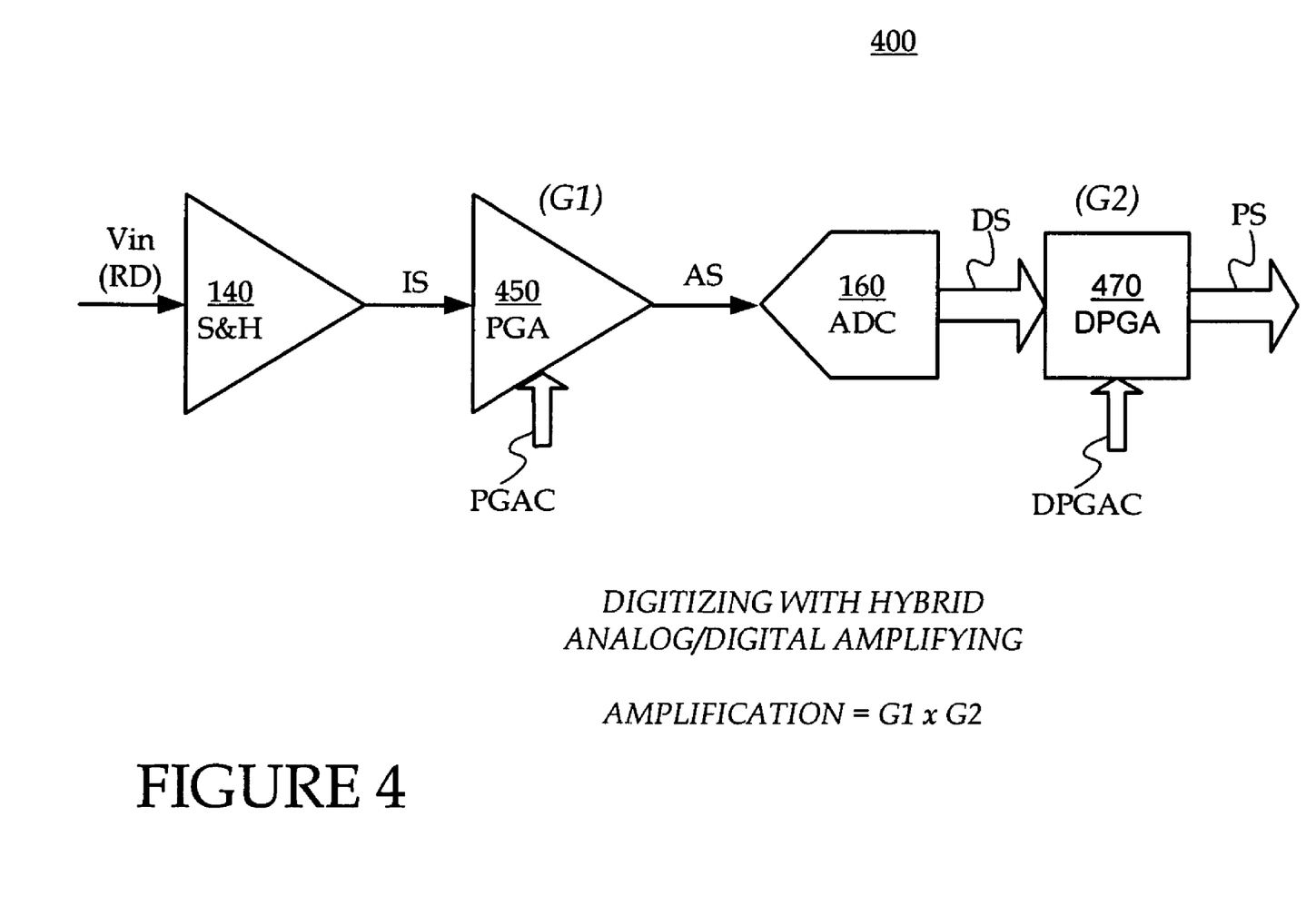
FIG. 4 illustrates a block diagram of an embodiment of an Analog Front End circuit for a digital imaging system that exhibits superior resolution, linearity and monotonicity.

FIG. 4 illustrates a block diagram of an Analog Front End circuit 400 according to an embodiment of the invention. Circuit 400 may be used to replace circuit 100 of FIG. 1, between CCD array 110 and digital image processor 120.

Circuit 400 includes Sample and Hold 140, Programmable Gain Amplifier (PGA) 450, ADC 160 and Digital Programmable Gain Amplifier (DPGA) 470. Sample and Hold 140 and ADC 160 may be constructed as recited the above. PGA 450 may be constructed as recited above for PGA 150, and it has a gain G1 that is controlled by a control signal PGAC. DPGA 470 amplifies digital signals with a gain G2 determined by a control signal DPGAC.

In operation, both control signals PGAC and DPGAC must be set at some value. Sample and Hold block 140 samples voltage Vin, and generates analog image samples IS. PGA 450 amplifies analog image samples IS, and generates amplified samples AS having a gain G1. ADC 160 digitizes amplified samples AS, and generates digitized samples DS. DPGA 470 multiplies digitized samples DS, and generates post amplified digitized samples PS having a gain G2. Accordingly, post amplified digitized samples PS are directed to the image processor, instead of merely amplified samples. The total gain is G1×G2.

Circuit 400 uses amplifying concurrently in the analog domain (via PGA 450) and the digital domain (via DPGA 470). As will be seen, circuit 400 exhibits superior resolution, linearity and monotonicity, because they exploit the advantages of each domain.

Figure 5A:
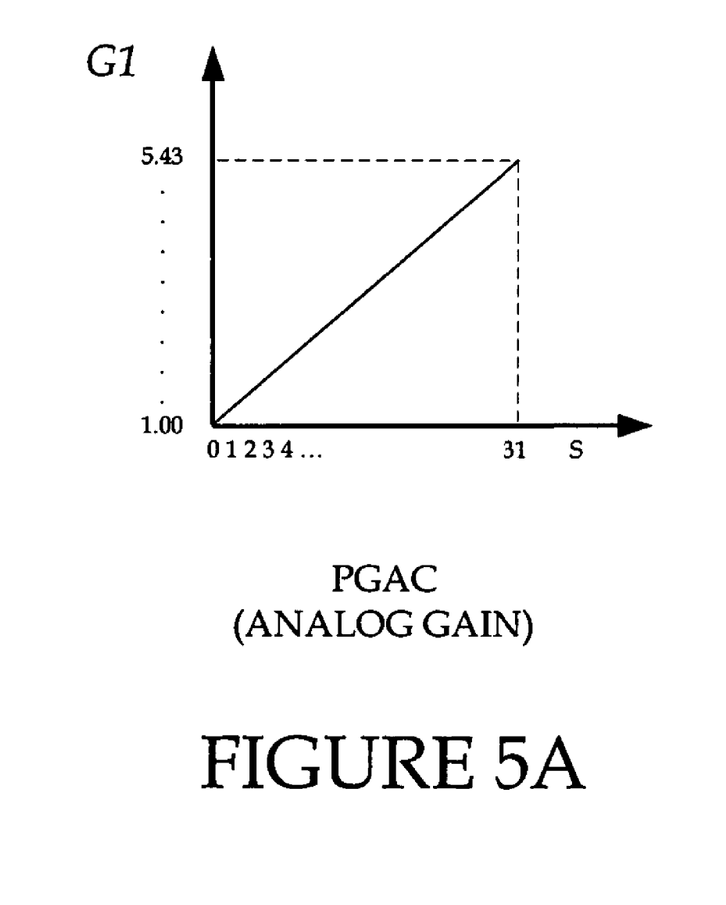
FIGS. 5A and 5B illustrate diagrams of gain characteristics of components of the circuit of FIG. 4.
Figure 5B:
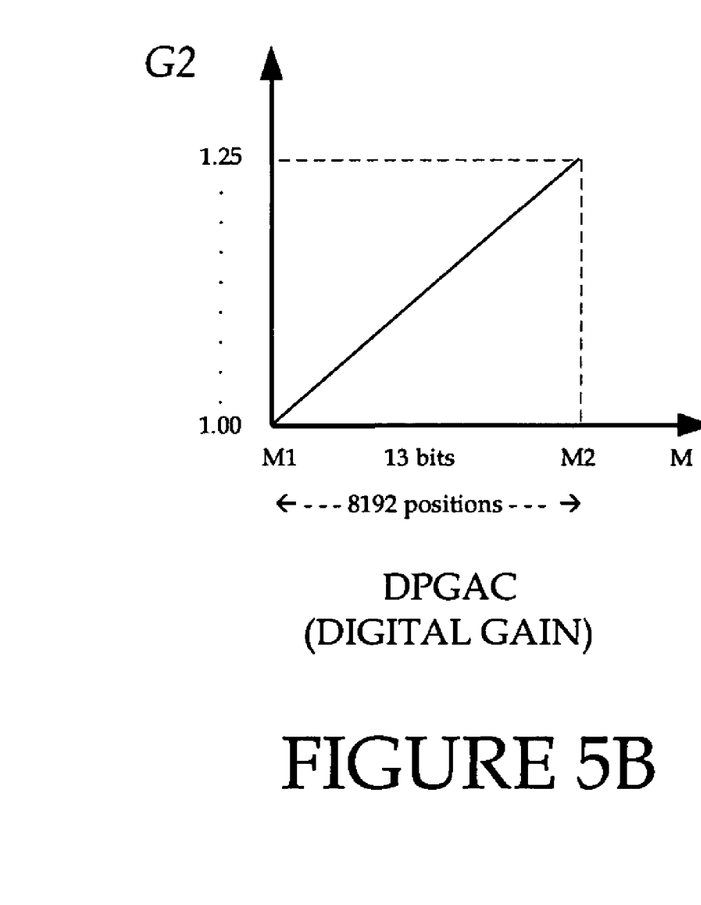

FIGS. 5A and 5B illustrate diagrams of how gain characteristics G1, G2 can be adjusted individually, to control the overall gain of circuit 400.

As seen in FIG. 5A, for gain G1, control signal PGAC can be implemented with a 5 bit word representing a number s that takes 32 values ranging between [0, . . . , 31]. Gain G1 can optionally but not necessarily follow a hyperbolic function, such as $G1(s)=1+s/(CT-s)$. If CT is set at 38, G1 takes values between [1.00, . . . , 4.75, 5.43]. This is a large dynamic range, and its largest step is the last, 5.43/4.75.

As seen in FIG. 5B, for gain G2, control signal DPGAC can be implemented with a 13 bit word representing a number M that takes 8192 values ranging between [0, . . . . 8191]. Gain G2 may well be chosen to be linear with M, and thus follow a linear function G2(M)=1+0.25(M/8191), thus taking values between [1.00, . . . , 1.25], which corresponds to about 2 dB. These values define a large resolution.

It is additionally preferred that the dynamic range of the DPGA be at least as large as the dynamic range of any one resolution step of the PGA, and preferably all of them. This condition is met in the design of FIGS. 5A and 5B. Indeed, the dynamic range of the DPGA is 1.25, which is larger than the dynamic range of the largest step of the PGA, which is 5.43/4.75=1.143. The total gain therefore ranges from (1×1×1)=1 to (2×5.43×1.25)=13.58→22.6 dB which corresponds to an equivalent resolution in excess of 13 bits.

FIG. 6 illustrates a table of exemplary values associated with a white pixel signal that is provided by an image sensor (CCD array, and the like) to one embodiment of the inventive Analog Front End (AFE) circuit based on at least the conditions that follow. The range of the white pixel voltage signal from the image sensor to the Programmable Gain Amplifier is Vin=0.1V-1.0V. The Analog to Digital Converter (ADC) employs 1.0V Vin for a full scale output, and the overall inventive circuit provides a variable gain ranging from 0 dB to 20 dB. Also, a five bit control word is employed to control the analog gain and a thirteen bit control word is employed to control the digital gain.

Additionally, for this embodiment of the AFE, the PGA target white pixel output voltage=0.8V to 1.0V which is fed to an ADC. Also, the DPGA supplies the remainder of the gain to bring the AFE digital output value up to a full scale value [Gmin(DPGA)=1/1.0=1.00; Gmax(DPGA)=1/0.8=1.25]. Furthermore, the input voltage range at each PGA gain setting abutts or overlaps the range of adjacent gain settings of the DPGA to reduce operational gaps. In this embodiment, five bits are employed to control the gain of the PGA.

Figure 7:
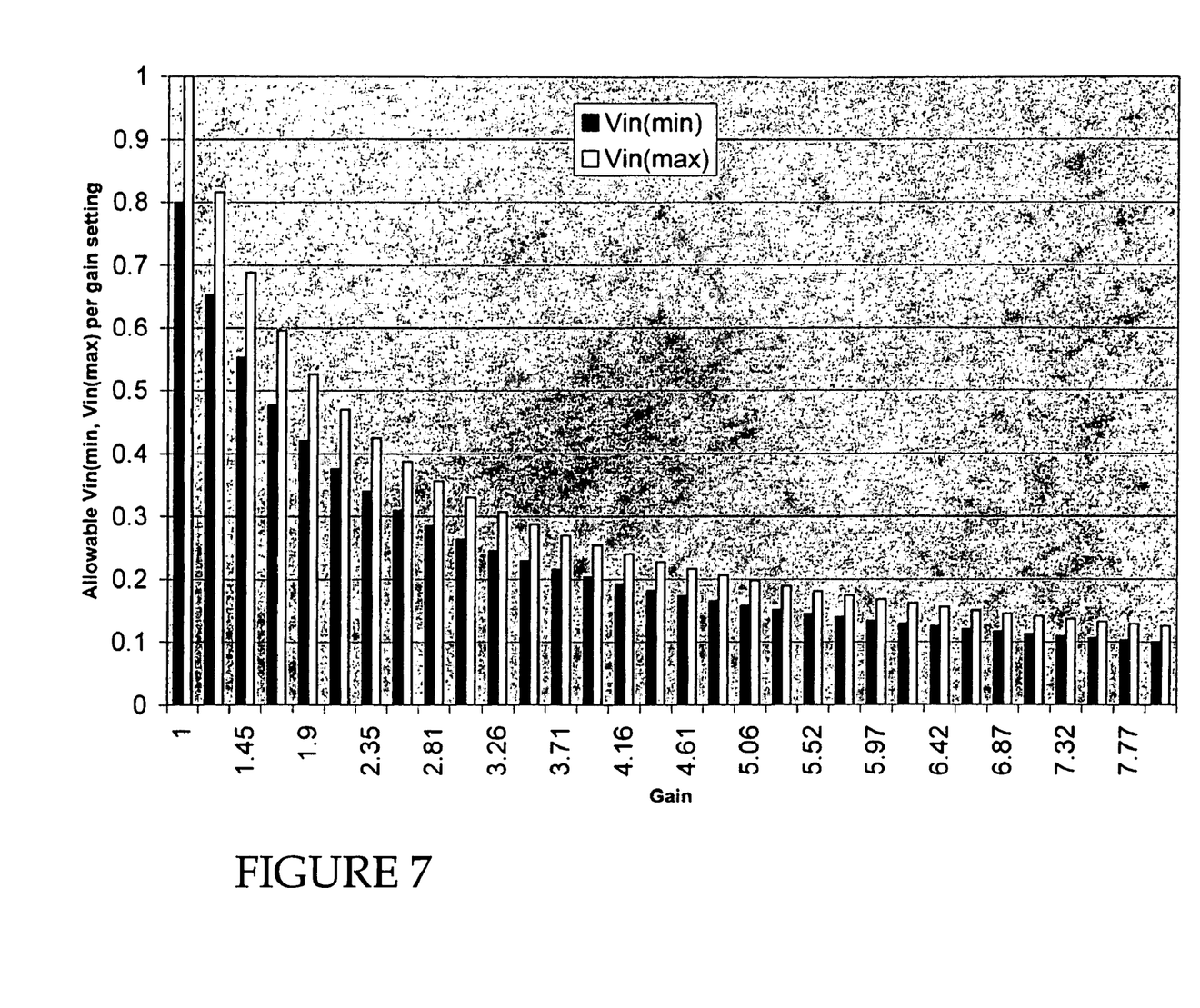
FIG. 7 is a diagram of bar charts for the values of the table of FIG. 6.

In the implementation of this embodiment, the PGA Gain (s)=1+N*s where s=0-31, N=7/31=0.2258064. This yields Gain(min)=1, Gain(max)=8 in 32 steps for the PGA as shown in FIG. 6. Also, FIG. 7 illustrates a bar graph of the table shown in FIG. 6, where there are no gaps between the allowed input voltage ranges on adjacent PGA gain settings (allowed input voltage ranges are defined as the span between the tops of the bars at any given gain setting). Additionally, the DPGA gain=1+0.25*M/8191 where M=0-8191 (13 bits). This arrangement yields Gain(min)=1, Gain(max)=1.25 in 8192 steps.

In FIG. 6, the column "Gain Ratio Previous Step" shows the minimum gain range required of the DPGA to cover the associated step between respective PGA gain settings. As shown, a DPGA gain range of 1.25:1 is more than adequate for all adjacent PGA gain steps. Also, a condition where the DPGA would be set to its highest gain of 1.25 occurs where Vin=0.1V and PGA gain=8 so that the combination of the gains of the PGA and DPGA would result in 8.0*1.25=10=20 dB.

As noted above, FIG. 7 graphically illustrates the data shown in the table of FIG. 6. It is noteworthy that the windows overlap; for any value along the vertical axis, such that there is at least one window (between the max and the min values) that covers it.

Figure 8:
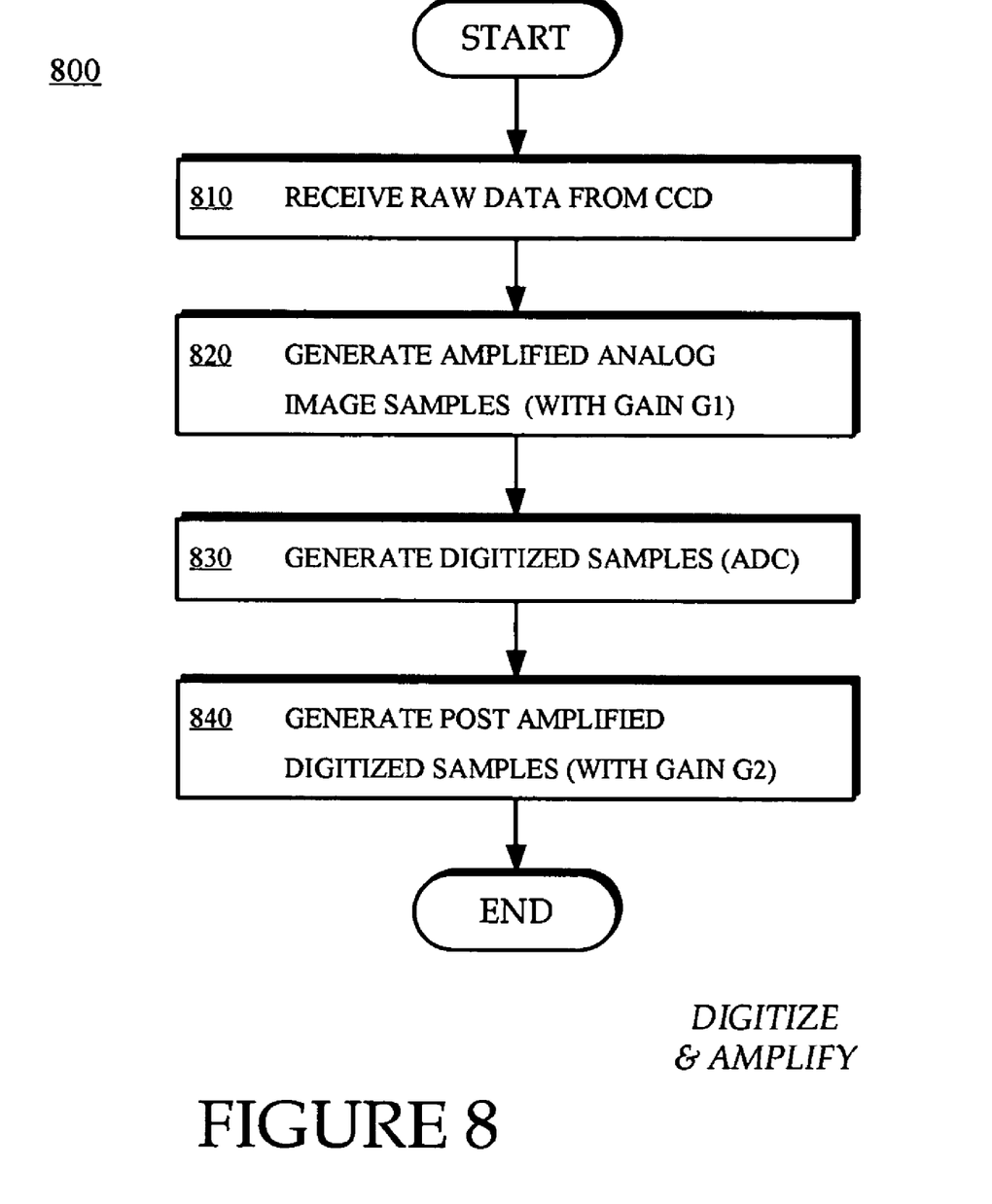
FIG. 8 illustrates a flowchart describing a digitizing and amplifying method that exhibits superior resolution, linearity and monotonicity.

FIG. 8 illustrates flowchart 800 describing a method according to an embodiment of the invention. The method of flowchart 800 may also be practiced by different embodiments of the invention, including but not limited to circuit 400.

Moving from a start block, the process advances to block 810, where raw data RD is received from a CCD array, and may be sampled to produce analog image samples IS. At next block 820, amplified analog samples AS are generated, by multiplying analog image samples IS with a gain G1. At next block 830, digitized samples DS are generated from analog samples AS. At next block 840, digitized samples DS are multiplied with a gain G2 to generate post amplified digitized samples. Then the process moves to an end block, from where it may perform other actions.

Calibration may be performed in any number of ways. For example, control signals PGAC and DPGAC may be set to zero, such that G1=G2=1. Then a reference white region may be scanned in, and the CCD output is received. The preliminary output is given a value ADCout(prelim). Then G1, G2 are chosen such that G1×G2=ADCout(target)/ADCout(prelim). ADCout(target) may be a value near the high end of the total available range.

Other methods involve calibrating that alternates between the analog range and the digital range. For example, one of the PGAC control signal and the DPGAC control signal can be set at a temporary value, while the other one is adjusted. Then the other signal is calibrated, while the adjusted signal is maintained constant, and so on. For either case, adjustment may be partial, or to the final calibrated value. A value of the DPGAC control signal may be calibrated concurrently with adjusting the value of the PGAC control signal.

Figure 9:
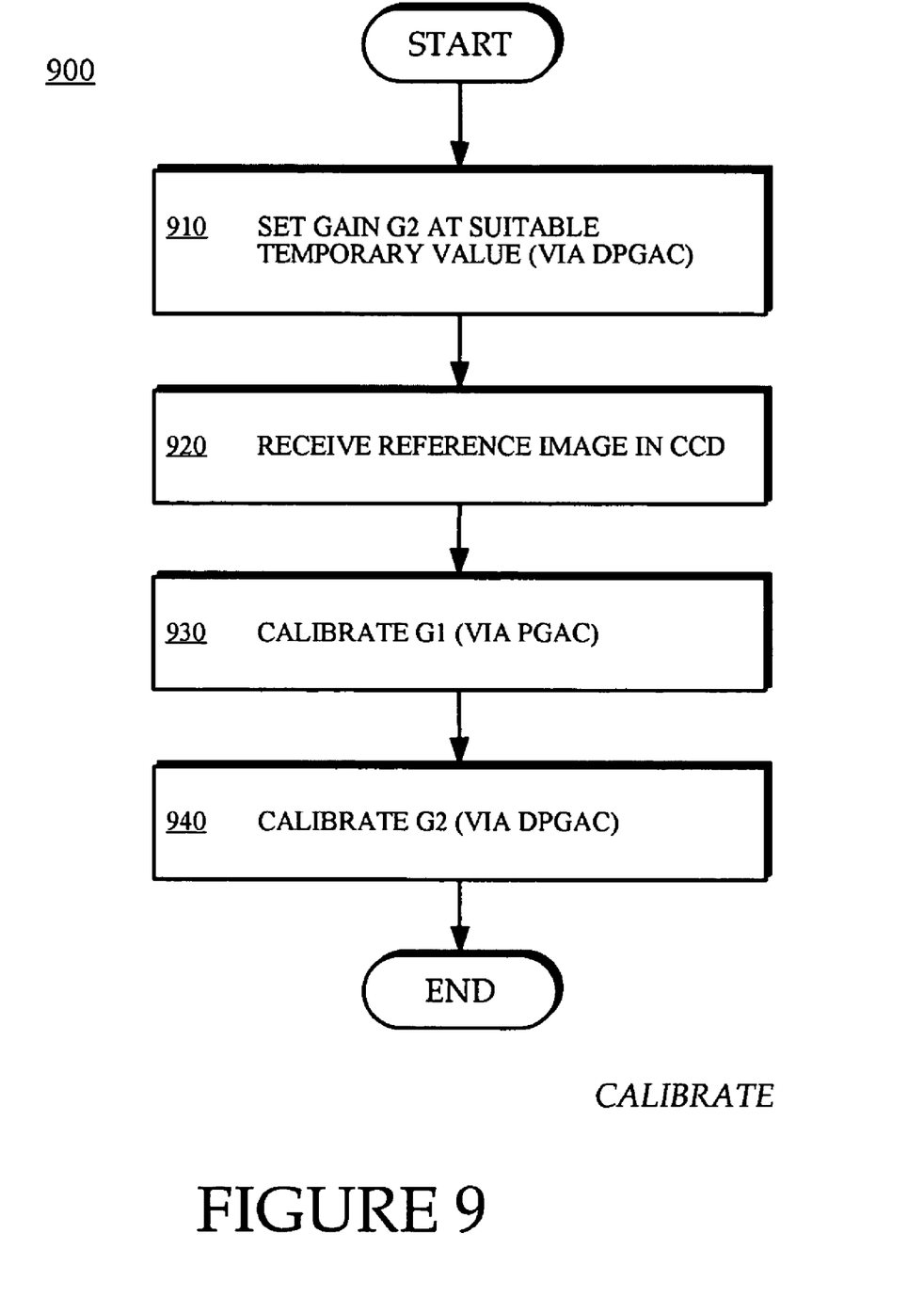
FIG. 9 is a flowchart illustrating a calibration method according to an embodiment of the present invention.

FIG. 9 illustrates flowchart 900 describing a calibration method according to an embodiment of the invention. The method of flowchart 900 may also be practiced by different embodiments of the invention, including but not limited to circuit 400.

Moving from a start block, the process advances to block 910, where a gain G2 is set to a suitable temporary value. One such temporary value is the midrange, but other values can also work. In some instances this may be accomplished by suitably adjusting a control signal DPGAC. If gain G2 has a linear characteristic and a dynamic range of 1.25, a signal DPGAC will be set at (1000 H), to produce a gain at midrange (1.125) of the available dynamic range. At next block 920, a reference image is received at a CCD array, such as reference white. At next block 930, gain G1 is calibrated fully, by adjusting control signal PGAC. Then at next block 940, gain G2 is calibrated fully, by adjusting control signals DPGAC, while maintaining control signals PGAC at its calibrated value.

Calibration algorithms that may be employed with the invention include, but are not limited to, those algorithms that follow.

Algorithm A

Gain values are initially set to G1=1, and G2=1.125 (P=0, s=00 H, M=1000 H). The image sensor output is fed through the AFE circuit while an optical white region is scanned.

Pass 1: G1 is modified by a servo loop to bring the ADC output to within 8% or less of the desired white pixel level, ADCout(target). Once this step is met, the first calibration pass is stopped and G1 is fixed. This preliminary ADC output white pixel value is defined as ADCout(coarse).

Pass 2: The DPGA gain is set to G2=ADCout(target)*1.125/ADCout(coarse). (Note that this requires 13-bit division.) Since ADCout(coarse) is already within 8% of the target, G2 changes by less than 8% (well within its available range) to achieve the overall target gain.

Gain calibration is complete.

In one implementation of calibration algorithm A, white pixel level calibration begins when the image sensor's output is fed through the AFE circuit while an optical white region is scanned. The target value for the white pixel level is chosen as ADCout(target)=3950.

Pass 1: Gain values are initially set to G1=1, and G2=1.125. The initial white pixel level observed at the ADC output, ADCout(coarse), is 1019. A binary search routine is executed which results in G1=3.8), which brings ADCout to 3872, which is within 8% of 3950.

Pass 2: ADCout(target)/ADCout(coarse) is calculated, yielding 3950/3872=1.0201, indicating that G2 must be increased by 1.0201. Then G2'=1.125*1.0201=1.1477 (noted here in base-10). M is set equal to 8192*(1.1477−1)/0.25=8192*0.1477/0.25=4840 (base-10)=1 0010 1110 1000 (base-2)=12E8 (hex). The resulting total gain G1*G2=3.8*1.1477=4.358.

Algorithm B

For this algorithm, gain values are initially set to G1=1, and G2=1. The image sensor's output is fed through the inventive AFE circuit while an optical white region is scanned. The preliminary ADC output white pixel value is defined as ADCout(prelim). G1 and G2 are chosen as appropriate such that G1*G2=ADCout(target)/ADCout(prelim). (13-bit division is employed for this calibration algorithm.) Gain calibration is complete.

Algorithm C

This algorithm employs a conventional search to set the 5 bits of G1, and a simple ramp to determine G2. Thus, no division or multiplication is employed in determining G2. Gain values are initially set to G1=1, and G2=1.125. The image sensor's output is fed through the inventive AFE circuit while an optical white region is scanned. A standard linear or binary search is used to set G1. As above, the target range is chosen to be within 8% of the target white pixel level. Once G1 is determined, the algorithm senses if the value of ADCout (coarse) is above or below ADCout(target). If ADCout(coarse)<ADCout(target), M is ramped upward from 1000 H until ADCout(target) is reached. If ADCout(coarse)>ADCout(target), M is ramped downward from 1000 H until ADCout(target) is reached. The search is stopped and gain calibration is complete.

Algorithm D

This algorithm employs a linear search to set all of the bits for the word employed to control the gain of the PGA. Gain values are initially set to G1=1, and G2=1.125. The image sensor output is fed through the inventive AFE circuit while an optical white region is scanned. A standard ramp-from-zero search is used to set G1. As above, the target range is chosen to be within 8% of the target white pixel level. Once G1 is determined, this algorithm determines if the value of ADCout(coarse) is above or below ADCout(target). If ADCout(coarse)<ADCout(target), M is ramped upward from 1000 H until ADCout(target) is reached. If ADCout(coarse)>ADCout(target), M is ramped downward from 1000 H until ADCout(target) is reached. The search is subsequently stopped; and gain calibration is complete.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A circuit for interfacing between an image sensor and a processor, comprising:
    a sampler operable to generate a plurality of analog image samples of an image by sampling a signal produced by the image sensor during a scanning of the image;
    a Programmable Gain Amplifier operable to generate a plurality of amplified samples by employing an analog gain to amplify the analog image sample;
    an Analog to Digital Converter operable to generate a plurality of digitized samples by digitizing the amplified samples; and
    a Digital Programmable Gain Amplifier operable to generate amplified digitized samples for the processor by employing a digital gain to amplify the digitized samples, wherein the digital gain of the Digital Programmable Gain Amplifier at least overlaps the analog gain of the Programmable Gain Amplifier for each step along a range of the analog signal.

2. The circuit of claim 1, further comprising a control signal that controls the analog gain and another control signal that controls the digital gain, wherein the digital gain at least overlaps the analog gain for each step along the range of the analog gain.

3. The circuit of claim 2, wherein
    the control signal employs a word with a number of bits that are substantially less than a number of bits in another word employed by the other control signal.

4. The circuit of claim 1, wherein
    a value of one of a control signal and another control signal is varied for the calibrating one of the Programmable Gain Amplifier or the Digital Programmable Gain Amplifier during which another value of the other one of the control signal and the other control signal is maintained relatively constant.

5. The circuit of claim 1, wherein
    generating the plurality of amplified digitized samples is performed within a dynamic range that is at least as large as a dynamic range of any one resolution step defined by generating the plurality of amplified image samples.

6. The circuit of claim 1, wherein the image sensor includes at least one of a charge coupled device (CCD) array and a diode.

7. The circuit of claim 1, wherein the processor is a digital image processor that is operable for a scanning system.

8. The circuit of claim 1, wherein one of a plurality of calibration algorithms are employed to calibrate the operation of the Programmable Gain Amplifier and the Digital Programmable Gain Amplifier prior to the generation of the plurality of amplified digitized samples for each scanned image.

9. The circuit of claim 1, further comprising a calibrator operable to calibrate each of the Programmable Gain Amplifier and the Digital Programmable Gain Amplifier prior to the generation of the plurality of amplified digitized samples for the processor.

10. A method for interfacing between an image sensor and a processor, comprising:
    generating a plurality of analog image samples by sampling a signal produced by the image sensor during the scanning of an image;
    generating a plurality of amplified samples by sampling the plurality of analog image samples with an analog gain;
    generating a plurality of digitized samples by digitizing the plurality amplified samples; and generating a plurality of amplified digitized samples for the image processor by amplifying the digitized samples with a digital gain that at least overlaps the analog gain over range of the analog gain, wherein the amplified digitized samples are provided to the processor for processing of the scanned image.

11. The method of claim 10, further comprising controlling the analog gain and controlling the digital gain, wherein the digital gain at least overlaps the analog gain over the range of the analog gain.

12. The method of claim 10, further comprising varying a value for calibrating one of the analog gain and the digital gain during which another value for calibrating the other one of the analog gain and the digital gain is maintained relatively constant.

13. The method of claim 10, wherein
generating the plurality of amplified digitized samples is performed within a dynamic range that is at least as large as a dynamic range of any one resolution step defined by the generation of the plurality of amplified image samples.

14. The method of claim 10, wherein one of a plurality of calibration algorithms are employed to calibrate the operation of the analog gain and the digital gain prior to the generation of the plurality of amplified digitized samples for each scanned image.

15. The method of claim 10, further comprising calibrating each of the analog gain and the digital gain prior to the generation of the plurality of amplified digitized samples for the processor.

16. The method of claim 15, further comprising
adjusting the digital gain until it is calibrated while the analog gain is held at a predetermined value; and
adjusting the analog gain until it is calibrated while the digital gain is held at its calibrated value.

17. The method of claim 15, further comprising
adjusting the analog gain until it is calibrated while the digital gain is held at a predetermined value; and
adjusting the digital gain until it is calibrated while the analog gain is held at its calibrated value.

18. A circuit for interfacing between an image sensor and a digital image processor, comprising:
a means for generating a plurality of analog image samples by sampling a signal produced by the image sensor during the scanning of an image;
a means for a Programmable Gain Amplifier to generate a plurality of amplified samples by amplifying the analog image sample;
a means for an Analog to Digital Convener to generate a plurality of digitized samples by digitizing the amplified samples;
a means for a Digital Programmable Gain Amplifier to generate amplified post-digitized samples for the image processor by digitally amplifying the digitized samples; and
a means for calibrating each of the Programmable Gain Amplifier and the Digital Programmable Gain Amplifier by employing one of a plurality of calibration algorithms prior to the scanning of each image.

19. The circuit of claim 1, wherein each step of the analog gain has an associated gain ratio, wherein the digital gain is at least as large as the largest gain ratio associated with the analog gain.

20. The circuit of claim 19, wherein each gain ratio is based on a value of the analog gain at a current step of the analog gain divided by another value of the analog gain at a previous step of the analog gain.

* * * * *

UNITED STATES PATENT AND TRADEMARK OFFICE
CERTIFICATE OF CORRECTION

PATENT NO. : 7,515,310 B2  
APPLICATION NO. : 10/791909  
DATED : April 7, 2009  
INVENTOR(S) : William Llewellyn et al.

It is certified that error appears in the above-identified patent and that said Letters Patent is hereby corrected as shown below:

In column 5, line 35, delete "abutts" and insert -- abuts --, therefor.

In column 8, line 64, in claim 10, delete "sampling" and insert -- amplifying --, therefor.

In column 9, line 4, in claim 10, after "over" insert -- a --.

In column 10, line 14, in claim 18, delete "Convener" and insert -- Converter --, therefor.

Signed and Sealed this

Third Day of November, 2009

David J. Kappos
*Director of the United States Patent and Trademark Office*